(12) United States Patent
Takeuchi et al.

(10) Patent No.: US 11,316,982 B2
(45) Date of Patent: *Apr. 26, 2022

(54) CALL TRANSFER SUPPORT SYSTEM

(71) Applicant: INTERNATIONAL BUSINESS MACHINES CORPORATION, Armonk, NY (US)

(72) Inventors: Emiko Takeuchi, Tokyo (JP); Yoshinori Kabeya, Kawasaki (JP); Daisuke Takuma, Toshima-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,250

(22) Filed: Jun. 1, 2021

(65) Prior Publication Data
US 2021/0289073 A1 Sep. 16, 2021

Related U.S. Application Data

(63) Continuation of application No. 16/691,172, filed on Nov. 21, 2019, now Pat. No. 11,057,526.

(51) Int. Cl.
| | |
|---|---|
| *H04M 3/42* | (2006.01) |
| *H04M 3/58* | (2006.01) |
| *H04M 3/523* | (2006.01) |
| *H04M 3/51* | (2006.01) |
| *H04M 3/22* | (2006.01) |
| *G10L 13/00* | (2006.01) |

(52) U.S. Cl.
CPC ............... *H04M 3/58* (2013.01); *G10L 13/00* (2013.01); *H04M 3/2218* (2013.01); *H04M 3/5175* (2013.01); *H04M 3/5183* (2013.01); *H04M 3/5237* (2013.01)

(58) Field of Classification Search
CPC .... H04M 3/58; H04M 3/5175; H04M 3/5183; H04M 3/2218; H04M 3/5233; H04M 3/5191
See application file for complete search history.

(56) References Cited

U.S. PATENT DOCUMENTS

| | | |
|---|---|---|
| 8,537,983 B1 | 9/2013 | Haggerty |
| 8,798,242 B1 | 8/2014 | Sankaranarayanan |
| 2017/0264746 A1 | 9/2017 | Milstein |
| 2018/0109680 A1 | 4/2018 | Korolev |
| 2020/0026538 A1 | 1/2020 | Cui |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Rasha S Al Aubaidi
(74) *Attorney, Agent, or Firm* — Dmitry Paskalov

(57) ABSTRACT

A computer retrieves a dialog information records of the active call of the first operator. The computer extracts features from the dialog information records. The computer determines a feature vector from the extracted features and determines a transfer probability value based on the feature vector and previous call transfers to the second operator.

20 Claims, 6 Drawing Sheets

(56) References Cited

OTHER PUBLICATIONS

Oki, "Points of call center operations", CRM Solution/Call Center, The 56th: Customer dissatisfaction with call centers is a big clue to problem solving, OKI Software, accessed Feb. 11, 2019, http://www.oki-osk.jp/product/crm/column/2018/c56.html, 3 pages.
IBM: List of IBM Patents or Patent Applications Treated as Related (Appendix P), Jun. 10, 2021, pp. 1-2.
Takeuchi et al., "Call Transfer Support System," Application and Drawings, Filed on Nov. 21, 2019, 35 Pages, U.S. Appl. No. 16/691,172.

CALL TRANSFER SUPPORT SYSTEM

BACKGROUND

The present invention relates, generally, to the field of computing, and more particularly to transferring calls between operators of a call center based on a transfer prediction model.

Call centers in enterprises, typically, have a variety of members ranging from newly employed operators to veterans who have extensive experience in various fields. Majority of the call centers have a dedicated software that allows operators to search for specific issues or requests of the callers. However, in case of an issue, that a newly employed operator is unable to handle, the operator simply raises his hand and more experienced or senior operator intervenes to assist the caller.

SUMMARY

According to one embodiment, a method, computer system, and computer program product for call transfer is provided. An embodiment may include a computer retrieving a dialog information records of the active call of the first operator. The embodiment may further extract features from the dialog information records. The embodiment may also determine a feature vector from the extracted features and a transfer probability value based on the feature vector and a previous call transfers to the second operator.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
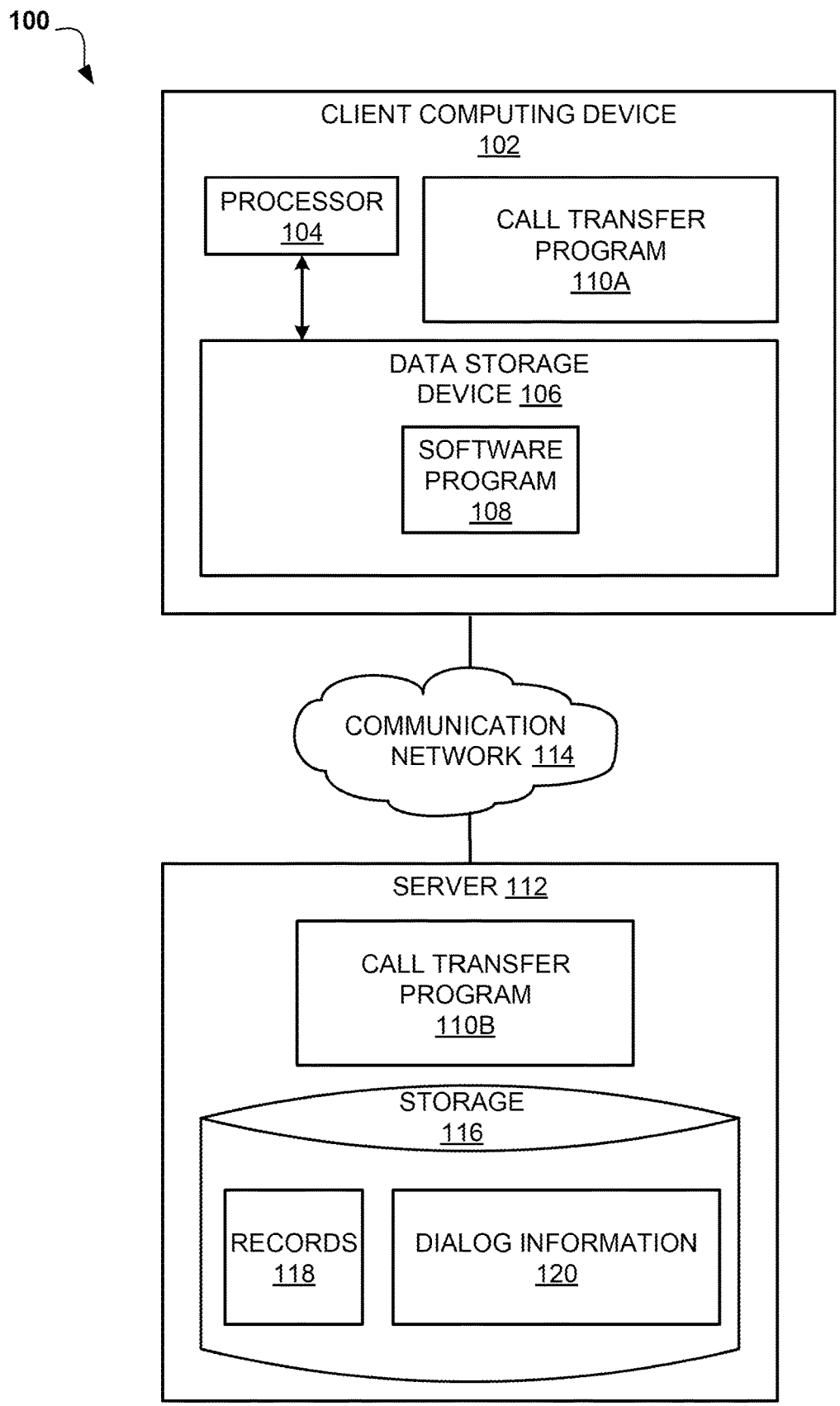
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to transferring calls based on a transfer prediction model. The following described exemplary embodiments provide a system, method, and program product to, among other things, automatically predict and perform a call transfer to a skilled operator based on a prediction model. Therefore, the present embodiment has the capacity to improve the technical field of computerized call center services by determining a call prediction model based on previous call transfers between the operators of the call center and thus improve performance of the call center by effectively transferring calls to a designated operator while avoiding repetitive questions and reducing response time to assist the caller.

As previously described, call centers in enterprises, typically have a variety of members ranging from newly employed operators to veterans who have an extensive experience in various fields. A majority of call centers have dedicated software that allows operators to search for specific issues or caller requests. However, in the event of an issue that a newly-employed operator is unable to handle, the operator simply raises his hand and a more experienced or senior operator may intervene to assist the caller.

Typically, operators are evaluated by the number of calls assisted and are expected to deal with incoming calls without any assistance from senior or more experienced operators. In majority of call centers, operators that have difficulties assisting clients raise their hand and more senior operators assist them by transferring the call to a skilled operator. However, in many other instances the call has to be transferred to another operator not only because of lack of experience but because there are specific operators that are in charge for a specific process, such as input data related to personal information.

As such, it may be advantageous to, among other things, implement a system that evaluates operators based on their previous handling of the calls including call duration, customer satisfaction and whether the call was transferred to another operator and establishes a model for transferring calls to a specific operator based on a feature vector. Then, based on the feature vector, the system may either recommend to transfer the call to a specific operator using a graphical user interface (GUI) of the call center or automatically transfer the call, thus improving the efficiency of the call center and increasing customer satisfaction.

Feature vector is a multidimensional vector where each value represents extracted from the dialog text features and temporal features. For example, feature vector may be in a flag (Boolean) format. Text features are features that may be extracted from the text itself, such as whether the customer asked a question, whether a discount was requested, or a customer requested that contact information or billing needs to be updated. Temporal features are typically time related features that are capable of being extracted through time analysis of the dialog, such as conversation duration, silent time of the operator, overall time of the communication, etc. Feature vector may be determined either by matching words and symbols in the converted to text conversation or by using a trained deep neural network.

According to one embodiment, a call transfer program may extract and analyze the dialog between each operator and their customer, establish a transfer prediction model by transferring each dialog to a feature vector that may be compared to a call transfer requirements settings and, by determining the probability of transfer value, either display the probability of transfer of the current call or transfer the call to the most appropriate available operator. In another embodiment, the call transfer program may analyze the call between a customer and a computer operator and determine an appropriate time to transfer the call to a human operator. In further embodiments, the transfer prediction model may be established and updated for each available operator.

According to an example embodiment, the transfer prediction model may be a mathematical expression that evaluates the feature vectors and the transfer information of each call and creates a set of rules or a transfer probability value that may be used to determine whether the current call should be transferred and the target operator that should answer the call based on a previously recorded dialogs and the operators that ended up receiving the call in the past. For example, the transfer prediction model may have a set of weights for each value of the feature vector that may be summarized into the transfer probability value and, if the value is above a predetermined threshold, the call should be transferred to an operator that has a highest transfer probability value that is above the predetermined threshold.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create a call transfer prediction model from the previous dialogs between operators and customers and determine when timing dictates transferring a call to a skilled operator is necessary.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a call transfer program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a call transfer program 110B and storing and accessing data from storage 116 and communicating with the client computing device 102 via the communication network 114, in accordance with embodiments of the invention. Storage 116 may be a tangible storage device 330 configured to store digital data such as voice calls in records 118, and logs, feature vectors and any data required for the operation of call transfer program 110B in dialog information 120. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the call transfer program 110A, 110B may be a program capable of analyzing previous calls, determining a feature vector from each call and creating and updating the transfer prediction model that is used to determine the probability of call transfer to a corresponding available operator. The call transfer method is explained in further detail below with respect to FIGS. 2A and 2B.

Figure 2A:
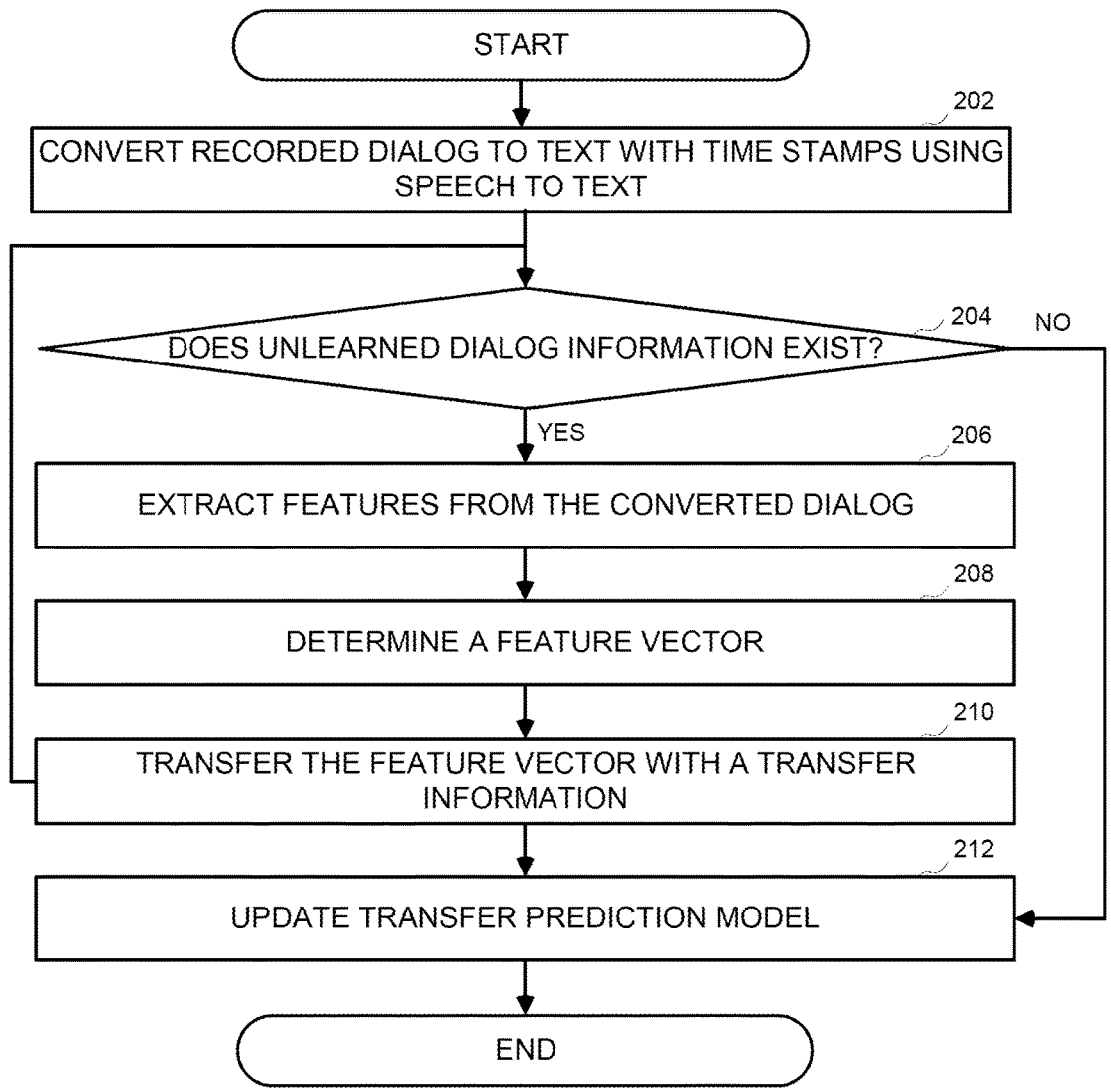
FIG. 2A is an operational flowchart illustrating a learning process for the call transfer support system, according to at least one embodiment.

Referring now to FIG. 2A, an operational flowchart illustrating a learning process for the call transfer support process 200A is depicted according to at least one embodiment. At 202, the call transfer program 110A, 110B converts recorded dialog to text with time stamps using speech-to-text technology. According to an example embodiment, call transfer program 110A, 110B may access stored recordings of previous conversations with customers from a database, such as records 118, and convert the recordings to text logs using natural language processing (NLP) techniques. NLP is a field of computer science, artificial intelligence, and computational linguistics related to the interactions between computers and human natural languages, such as programming computers to process natural language and convert it from voice to text. According to an example embodiment, call transfer program 110A, 110B may convert the voice recordings to a log where each question of the customer and operator answer is accompanied by the corresponding time stamp.

Then, at 204, the call transfer program 110A, 110B determines whether unlearned dialog information exists for the recording. For example, call transfer program 110A, 110B may check whether the feature vector was generated for the corresponding dialog. If the call transfer program 110A, 110B determines that the feature vector does not exist (i.e., that an unlearned dialog information exists) (step 204, "YES" branch), the call transfer program 110A, 110B may continue to step 206 to extract features from the converted dialog. If the call transfer program 110A, 110B determines that there are no unlearned dialog information (i.e., the feature vector exists for the dialog) (step 204, "NO" branch), the call transfer program 110A, 110B may continue to step 212 to update transfer prediction model.

Next, at 206, the call transfer program 110A, 110B extracts features from the converted dialog. According to an example embodiment, call transfer program 110A, 110B may extract text features and temporal features from the converted dialog in a flag (Boolean) format. Text features may be features that may be extracted from the text itself, such as whether the customer asked a question, whether a discount was requested, or a customer requested that contact information or billing needs to be updated. Temporal features may be features that are capable of being extracted through time analysis, such as conversation time duration, silent time of the operator, etc. According to an example embodiment, the call transfer program 110A, 110B may extract text features using a simple search for specific words or symbols in the converted dialog while temporal features may be calculated from time data.

For example, consider the following dialog:

TABLE 1

| Speaker | Time | Speech |
|---|---|---|
| Operator A | 14:00:05 | ... your inquiry is about the insurance for your wife. |
| Customer | 14:00:45 | Yes, I heard we can get a family discount. |
| Operator A | 14:00:51 | Discount ..., hold on please. I will check the insurance information. |
| . | . | . |
| . | . | . |
| . | . | . |
| | 14:33:52 | <Transfer> (From Operator A→Operator Z) |

To continue the previous example, call transfer program 110A, 110B may determine call statistics using NLP, voice analysis, text analysis, and/or statistical analysis. For example, the call transfer program 110A, 110B may determine, that no questions were asked, that "family" and "discount" words were used during the conversation and that the silent time was 25.2 seconds while the total call duration was 98 seconds.

Next, at 208, the call transfer program 110A, 110B determines a feature vector. According to an example embodiment, the call transfer program 110A, 110B may generate a feature vector in a flag (Boolean) format. To continue the previous example, call transfer program 110A, 110B may generate the following feature vector from the values of the extracted features:

TABLE 2

| Dimension (Features) | Value |
|---|---|
| Question* | 0 (no) |
| Family* | 1 (yes) |
| Discount* | 1 (yes) |
| . | . |
| . | . |
| . | . |
| Silent time | 25.2 |
| Duration | 98.0 |
| . | . |
| . | . |
| . | . |

In another embodiment, the call transfer program 110A, 110B may consider additional elements, such as search count that the operator performed during the call, search result click count of the operator during the call, a career of the operator, and whether the topic is new to the operator.

In a further embodiment, the call transfer program 110A, 110B may utilize word embedding or a trained neural network to transfer the dialog into a set of vectors that afterwards may determine dimensions using a trained neural network. Word embedding is typically a collective name for a set of language modeling and feature learning techniques in NLP where words or phrases from a text are mapped to vectors or a set of coordinates of real numbers. A neural network is a computational model in computer science that is based on a collection of neural units. Each neural unit is an artificial neuron that may be connected with other neural units to create a neural network. The neural network may then be trained to find a solution to a problem where a traditional computer program fails, such as NLP of a text or word embedding.

In another embodiment, Bayesian inference models may be introduced that are based on a method of statistical inference of a probability where the Bayes theorem is used to update the probability each time related information becomes available.

In further embodiments, the call transfer program 110A, 110B may utilize a logistic regression if the feature vector elements are independently effective and deep neural network when considering combinatorial relationships between elements of the feature vector.

Next, at 210, the call transfer program 110A, 110B transfers the feature vector with a transfer information to storage. According to an example embodiment, call transfer program 110A, 110B may store the feature vector and the transfer information in the dialog information 120. Transfer information may be any additional information related to the analyzed call such as whether the call was transferred, a name or a phone of the operator where the call was transferred or other identification of the call transfer.

Next, at 212, the call transfer program 110A, 110B updates the transfer prediction model. According to an example embodiment, call transfer program 110A, 110B may create and update the transfer prediction model that evaluates the feature vector and the transfer information to create a set of rules or a probability as to whether the call should be transferred and the target of the transfer based on a previous transfers. As previously mentioned, the model may have a set of weights for each value of the feature vector that may be updated based on the transfer. For example, the values may be weighted according to the following table:

| Dimension | Value |
|---|---|
| Question | 0.01 |
| Product | −0.03 |
| Discount | 0.17 |
| . | . |
| . | . |
| . | . |
| Silent time | 0.59 |
| Duration | 0.2 |
| . | . |
| . | . |
| . | . |

In further embodiments, the call transfer program 110A, 110B may update the weights based on the summarized value (i.e. the transfer probability value) such as that the similar feature vector (where the feature vector values having same or similar values) would trigger transfer to the same operator.

Figure 2B:
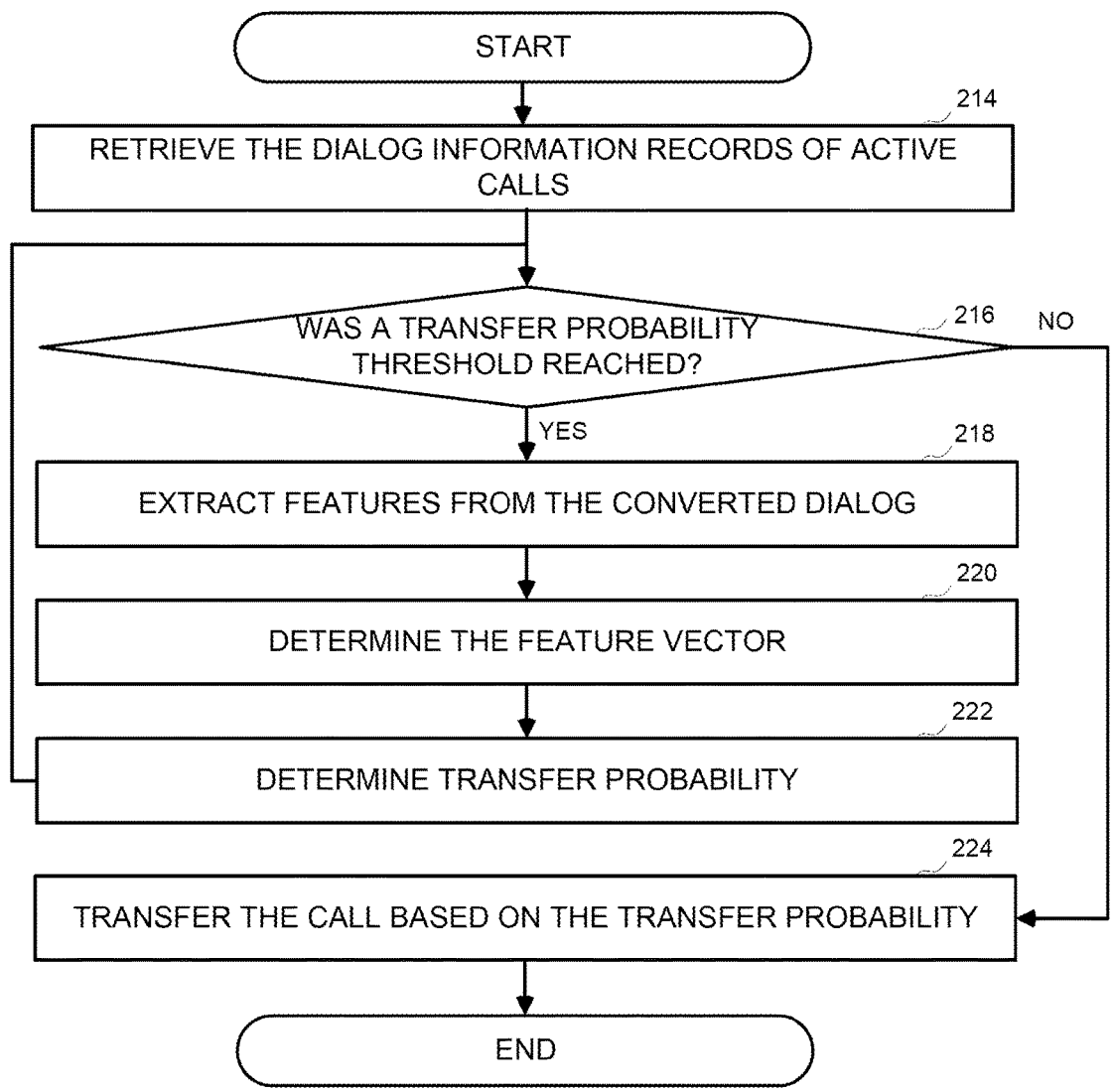
FIG. 2B is an operational flowchart illustrating a prediction process for the call transfer support system, according to at least one embodiment.

Referring now to FIG. 2B, an operational flowchart illustrating a prediction process for the call transfer support process 200B is depicted according to at least one embodiment. At 214, the call transfer program 110A, 110B retrieves the dialog information records of active calls. According to an example embodiment, the call transfer program 110A, 110B may use NLP techniques to convert an ongoing call in real time from speech to text with a corresponding time stamp representing when each statement of the conversation started. For example, Table 1 above represents statements of the caller and operator with the corresponding timestamp.

Then, at 216, the call transfer program 110A, 110B determines whether a transfer probability was reached for the current call. According to an example embodiment, call transfer program 110A, 110B may make a determination based on whether a transfer probability value is above a transfer threshold value that is set by the user. In another embodiment, call transfer program 110A, 110B may make a determination based on an overall time of the current call, or a silent time of the operator. In a further embodiment, the call transfer program 110A, 110B may convert the extracted dialog into a preliminary feature vector multiplied by the weighted value of the transfer prediction model that may be compared to a specific threshold value. If the call transfer program 110A, 110B determines that the transfer probability was reached (i.e. that the transfer probability value is above a transfer threshold value) (step 216, "YES" branch), the call transfer program 110A, 110B may continue to step 218 to extract features from the conversation dialog. If the call transfer program 110A, 110B determines that no unprocessed dialog information exists (step 216, "NO" branch), the call transfer program 110A, 110B may continue to step 224 to transfer the call based on the transfer probability.

Next, at 218, the call transfer program 110A, 110B extracts features from the converted dialog. According to an example embodiment, call transfer program 110A, 110B may extract text features and temporal features from the converted dialog in a flag (Boolean) format. For example, text features may be illustrated by the first three features in Table 2 while temporal features may be the bottom two features in Table 2. According to an example embodiment, call transfer program 110A, 110B may extract text features using similar techniques as in step 206 (See FIG. 2A), such as by natural language search for specific words or symbols in the converted dialog, while temporal features may be calculated from time data, such as a time log of the converted conversation.

Next, at 220, the call transfer program 110A, 110B determines a feature vector. According to an example embodiment, call transfer program 110A, 110B may generate a feature vector in a flag (Boolean) format, similar to step 208 (See FIG. 2A). As previously mentioned, call transfer program 110A, 110B may determine call statistics using NLP, voice analysis, text analysis, and/or statistical analysis. For example, the call transfer program 110A, 110B may determine, whether questions were asked by the caller, that predetermined key words were used, such as "family", "discount", "transfer", during the call and assign Boolean flags at the specific dimension of the feature vector. In addition, call transfer program 110A, 110B may analyze time stamps during the call, such as the overall call duration, time duration between the caller's question, and operator's answer.

In another embodiment, call transfer program 110A, 110B may utilize word embedding or a trained neural network to transfer the dialog into a set of vectors that, afterwards, may determine dimensions using the trained neural network. In yet another embodiment, Bayesian inference models may be introduced that are based on a method of statistical inference of a probability where the Bayes theorem is used to update the probability each time related information becomes available.

Next, at 222, the call transfer program 110A, 110B determines transfer probability. According to an example embodiment, the call transfer program 110A, 110B may summarize the multiplication between the feature vector values with the corresponding weights that the call transfer program 110A, 110B determined during the learning process and stored in dialog information 120. The summarized value may then be converted to a transfer probability value that, afterwards, may be compared to a call transfer threshold value in order to determine whether the call transfer program 110A, 110B should transfer the call to another operator. According to an example embodiment, the call transfer program 110A, 110B may determine the transfer probability value by normalizing the summarized value. In another embodiment, the call transfer program 110A, 110B may determine the transfer probability value using a trained deep neural network or Bayesian inference model. In further embodiments, the call transfer program 110A, 110B may determine the transfer probability value for each available operator.

Next, at 224, if the call transfer program 110A, 110B determines all dialog information has been processed, the call transfer program 110A, 110B transfers the call based on the transfer probability. According to an example embodiment, call transfer program 110A, 110B may display the active calls to one or more operators using a GUI where the transfer probability value, or its percentage representation, is shown in descending order for each call. An available operator may review the transfer probability and the call transcript and request the transfer of the call to his phone through a user selection on the GUI. In another embodiment, call transfer program 110A, 110B may display the transfer probability value, or its percentage representation, based on a personal transfer prediction model calculated for each available operator. In a further embodiment, call transfer program 110A, 110B may transfer the call to the available operator that has the highest transfer probability value, or its highest percentage representation, when the value is calculated for each available operator individually.

It may be appreciated that FIGS. 2A-2B provides only an illustration of one implementation and does not imply any limitations with regard to how different embodiments may be implemented. Many modifications to the depicted environments may be made based on design and implementation requirements.

Figure 3:
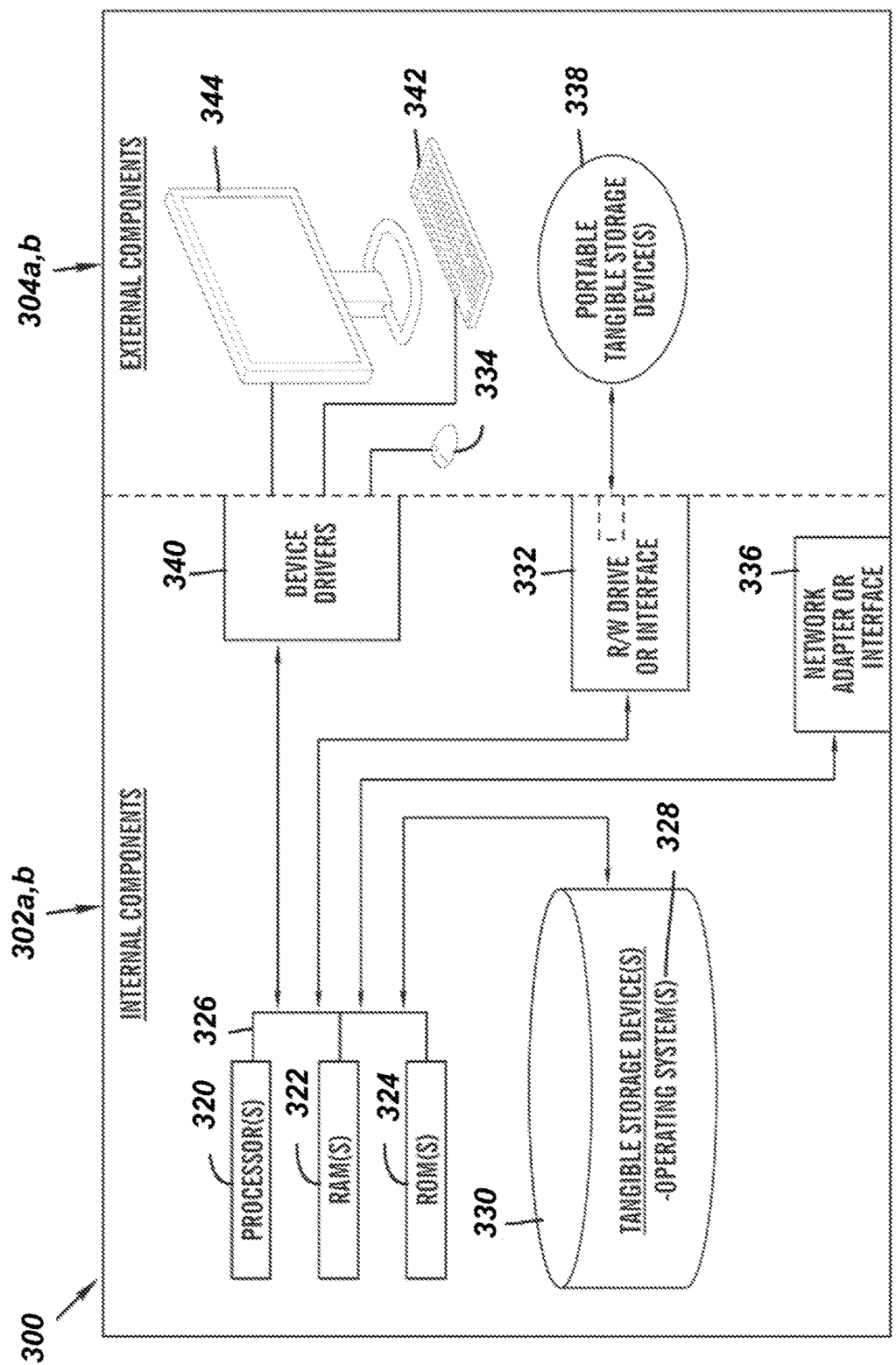
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the call transfer program 110A in the client computing device 102, and the call transfer program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the call transfer program 110A in the client computing device 102 and the call transfer program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the call transfer program 110A in the client computing device 102 and the call transfer program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
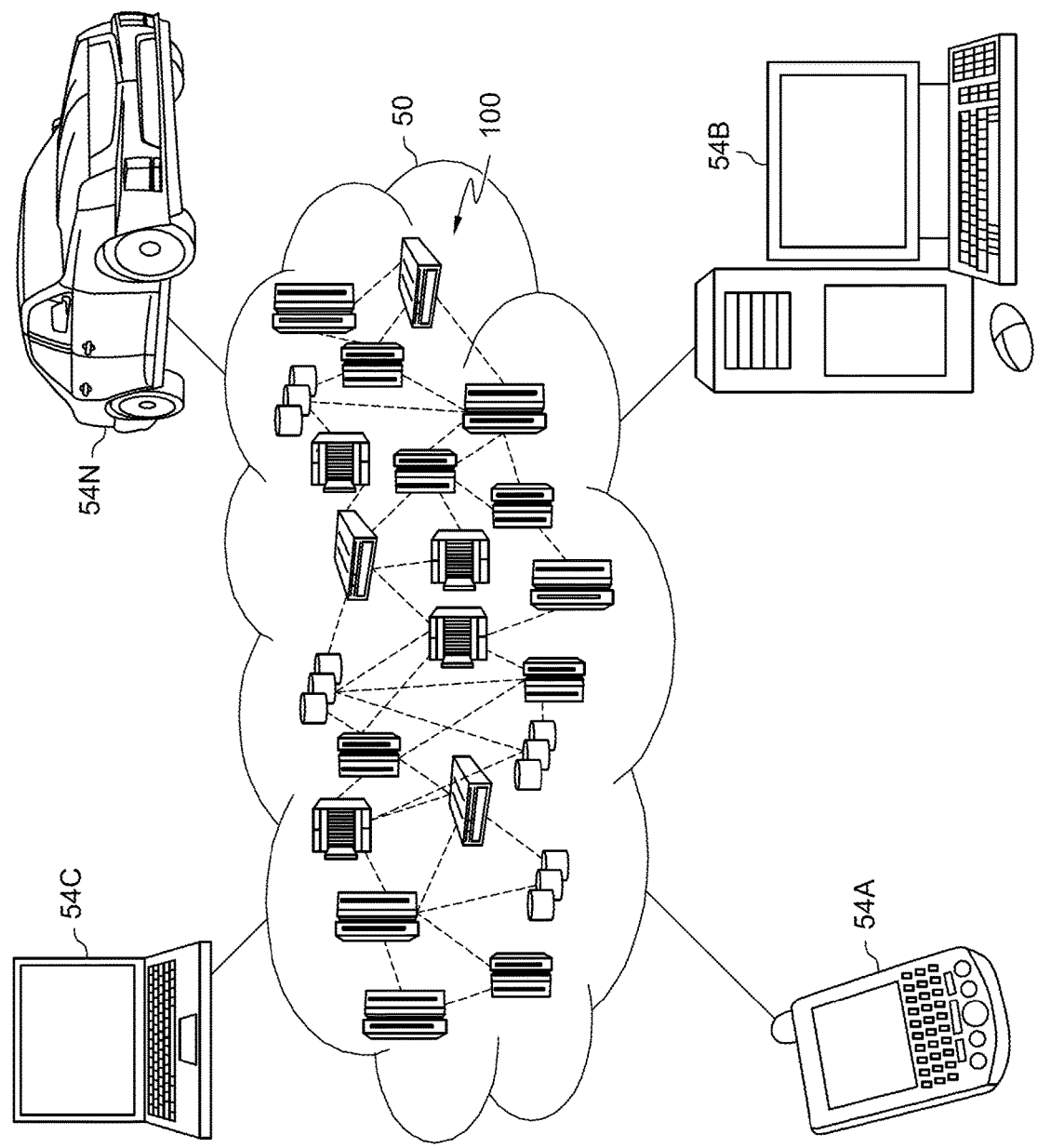
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
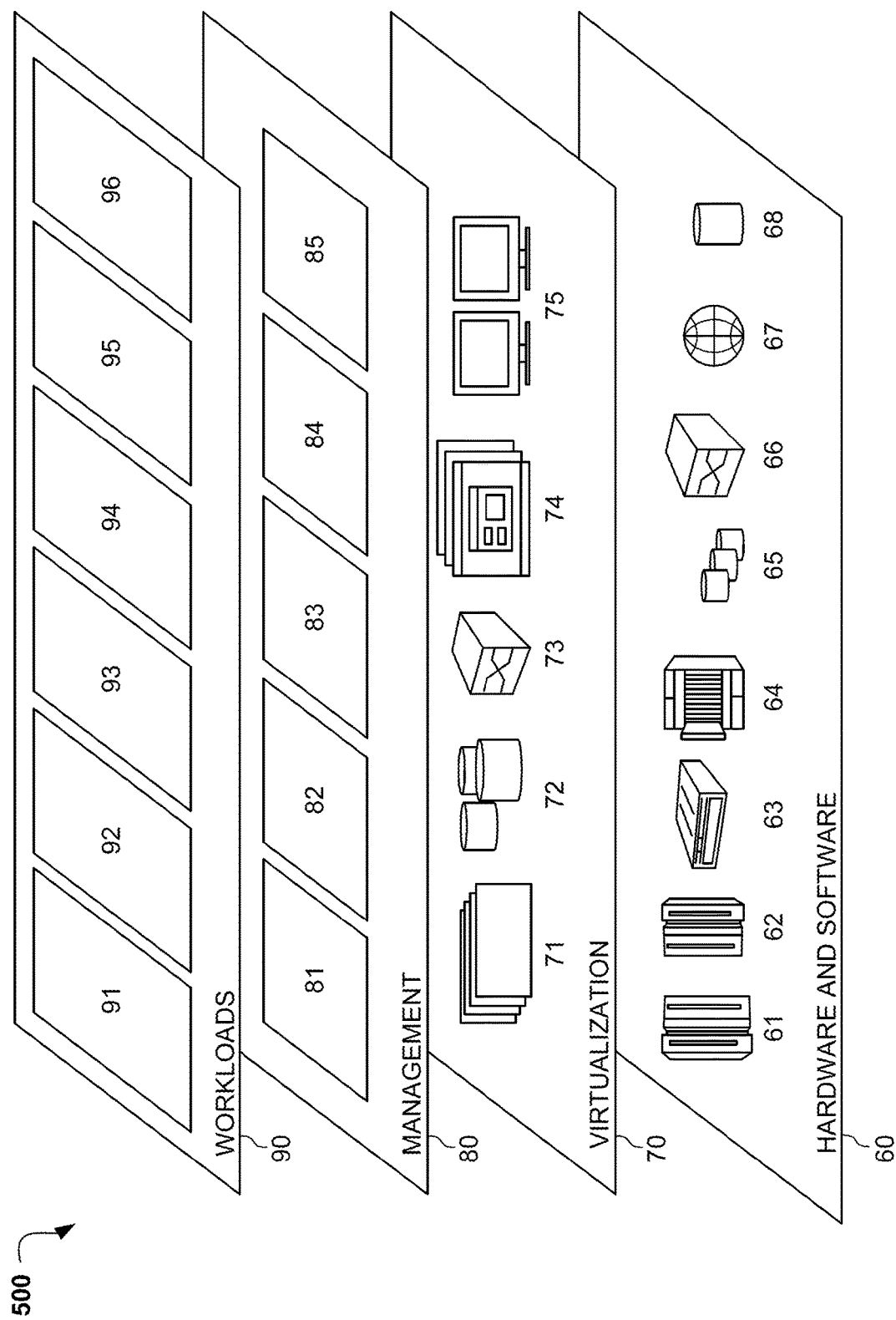
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and call transfer prediction 96. Call transfer prediction 96 may relate to analyzing incoming calls of a calling center and by transferring each call into a feature vector determining whether the call should be transferred to a different operator.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for transferring an active call, the method comprising:
   retrieving dialog information records;
   extracting features from the dialog information records;
   determining a feature vector from the extracted features;
   determining a transfer probability value based on the feature vector and previous call transfers to a second operator, wherein the transfer probability value is determined by summarizing each dimension of the feature vector multiplied by a corresponding weight to each dimension; and
   transferring the active call to the second operator based on determining the transfer probability value is above a threshold value.

2. The method of claim 1, further comprising:
   transferring the active call to the second operator based on determining the transfer probability value is above a threshold value.

3. The method of claim 1, wherein determining the transfer probability value based on the feature vector and previous call transfers to the second operator comprises:
   extracting features from the dialog information records of each previous call to the second operator;
   determining a feature vector from the extracted features;
   determining a corresponding weight to the transfer probability value by a transfer prediction model;
   updating the transfer prediction model, wherein the transfer prediction model comprises a set of weights updated for each value of the feature vector; and determining the transfer probability value based on applying the feature vector of the active call to the transfer prediction model.

4. The method of claim 3, wherein updating the transfer prediction model is by a logistic regression when the feature vector has elements that are independently effective and by a deep neural network when the elements have combinatorial relationships.

5. The method of claim 1, wherein extracting features from the dialog information records is by deep neural network.

6. The method of claim 1, wherein the dialog information records are converted using text-to-speech dialogs with a corresponding timestamp.

7. The method of claim 6, wherein the feature vector comprises text features and temporal features, wherein the text features are extracted from the dialog information records and temporal features are extracted from a time log.

8. A computer system for transferring an active call, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
retrieving dialog information records;
extracting features from the dialog information records;
determining a feature vector from the extracted features;
determining a transfer probability value based on the feature vector and previous call transfers to a second operator, wherein the transfer probability value is determined by summarizing each dimension of the feature vector multiplied by a corresponding weight to each dimension; and
transferring the active call to the second operator based on determining the transfer probability value is above a threshold value.

9. The computer system of claim 8, further comprising:
transferring the active call to the second operator based on determining the transfer probability value is above a threshold value.

10. The computer system of claim 8, wherein determining the transfer probability value based on the feature vector and previous call transfers to the second operator comprises:
extracting features from the dialog information records of each previous call to the second operator;
determining a feature vector from the extracted features;
determining a corresponding weight to the transfer probability value by a transfer prediction model;
updating the transfer prediction model, wherein the transfer prediction model comprises a set of weights updated for each value of the feature vector; and
determining the transfer probability value based on applying the feature vector of the active call to the transfer prediction model.

11. The computer system of claim 10, wherein updating the transfer prediction model is by a logistic regression when the feature vector has elements that are independently effective and by a deep neural network when the elements have combinatorial relationships.

12. The computer system of claim 8, wherein extracting features from the dialog information records is by deep neural network.

13. The computer system of claim 8, wherein the dialog information records are converted using text-to-speech dialogs with a corresponding timestamp.

14. The computer system of claim 13, wherein the feature vector comprises text features and temporal features, wherein the text features are extracted from the dialog information records and temporal features are extracted from a time log.

15. A computer program product for transferring an active call, the computer program product comprising:
one or more computer-readable tangible storage medium and program instructions stored on at least one of the one or more tangible storage medium, the program instructions executable by a processor, the program instructions comprising:
program instructions to retrieve dialog information records;
program instructions to extract features from the dialog information records;
program instructions to determine a feature vector from the extracted features;
program instructions to determine a transfer probability value based on the feature vector and previous call transfers to a second operator, wherein the transfer probability value is determined by program instructions to summarize each dimension of the feature vector multiplied by a corresponding weight to each dimension; and
program instructions to transfer the active call to the second operator based on determining the transfer probability value is above a threshold value.

16. The computer program product of claim 15, further comprising:
program instructions to transfer the active call to the second operator based on determining the transfer probability value is above a threshold value.

17. The computer program product of claim 15, wherein program instructions to determine the transfer probability value based on the feature vector and previous call transfers to the second operator comprises:
program instructions to extract features from the dialog information records of each previous call to the second operator;
program instructions to determine a feature vector from the extracted features;
program instructions to determine a corresponding weight to the transfer probability value by a transfer prediction model;
program instructions to update the transfer prediction model, wherein the transfer prediction model comprises a set of weights updated for each value of the feature vector; and
program instructions to determine the transfer probability value based on applying the feature vector of the active call to the transfer prediction model.

18. The computer program product of claim 17, wherein program instructions to update the transfer prediction model is by a logistic regression when the feature vector has elements that are independently effective and by a deep neural network when the elements have combinatorial relationships.

19. The computer program product of claim 15, wherein program instructions to extract features from the dialog information records is by deep neural network.

20. The computer program product of claim 15, wherein the dialog information records are converted using text-to-speech dialogs with a corresponding timestamp.

* * * * *